(12) United States Patent
Inui et al.

(10) Patent No.: US 7,026,576 B2
(45) Date of Patent: Apr. 11, 2006

(54) WELDING WIRE AND WELDING METHOD USING THE WIRE

(75) Inventors: Keigo Inui, Aichi (JP); Hirotaka Minamikawa, Aichi (JP); Toshiharu Noda, Aichi (JP)

(73) Assignee: Daido Tokushuko Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/463,108

(22) Filed: Jun. 16, 2003

(65) Prior Publication Data

US 2004/0056012 A1    Mar. 25, 2004

(30) Foreign Application Priority Data

Sep. 20, 2002   (JP)   ............................. 2002-276011
May 29, 2003   (JP)   ............................. 2003-153192

(51) Int. Cl.
  *B23K 35/22*   (2006.01)
(52) U.S. Cl. ............................. 219/146.1; 219/146.23; 219/137 WM
(58) Field of Classification Search ............. 219/146.1, 219/146.23, 146.52, 136, 137 R, 137 WM
See application file for complete search history.

(56) References Cited

U.S. PATENT DOCUMENTS 4,871,898 A * 10/1989 Cherne et al. .......... 219/137 R
4,987,288 A *  1/1991 Yonker, Jr. ............... 219/146.1

FOREIGN PATENT DOCUMENTS

| EP | 1 008 417 A1 | 6/2000 |
| JP | 5-138394 A | 6/1993 |
| JP | 9-225680 A | 9/1997 |
| JP | 9225680 | * 9/1997 |

OTHER PUBLICATIONS

Patent Abstracts of Japan, vol. 2000, No. 25, Apr. 12, 2001, of JP 2001 219291 A (Daido Steel Co. LTD.), Aug. 14, 2001.
Patent Abstracts of Japan, vol. 1998, No. 01, Jan. 30, 1998, of JP 09 225680A (Daido Steel Co. LTD.), Sep. 2, 1997.
Patent Abstracts of Japan, vol. 017, No. 520 (M-1482), Sep. 20, 1993, of JP 05 138394A (Kobe Steel LTD.), Jun. 1, 1993.

* cited by examiner

*Primary Examiner*—M. Alexandra Elve
(74) *Attorney, Agent, or Firm*—Frishauf, Holtz, Goodman & Chick, P.C.

(57) ABSTRACT

A welding wire contains 0.025 mass % or less C, 1.3 mass % or less Si, 2.0 mass % or less Mn, 10 to 25 mass % Cr, 0.04 to 0.2 mass % N, Al and Ti in amounts (mass %) satisfying the relationship: $e^{-800(x-0.05)^2} \times e^{-300(y-0.08)^2} \geq 0.5$, where x and y represent contents (mass %) of Al and Ti, respectively, O in an amount (mass %) satisfying the relationship: $z < (x+y-0.01)/0.5$, where z represents a total amount (mass %) of oxygen in the welding wire, and the balance being Fe and unavoidable impurities. Gas-shielded welding is performed using the welding wire and a shielding gas containing Ar and at least one of $O_2$ and $CO_2$, wherein, provided that volume % of the $O_2$ and $CO_2$ contained in the shielding gas are p and q, respectively, the shielding gas satisfies the relationships: $p \leq 10$; $q \leq 50$; and $p+q \leq (x+y-0.01-0.5\ z)/0.0006$, whereby a weld improved in high-temperature resistance and crack resistance can be formed.

11 Claims, 2 Drawing Sheets

WELDING WIRE AND WELDING METHOD USING THE WIRE

BACKGROUND OF THE INVENTION

1. Field of the Invention

The present invention relates to a welding wire capable of forming a weld having high strength at elevated temperatures as well as high crack resistance, and a welding method using the welding wire.

2. Description of the Related Art

When welding such as butt welding or fillet welding is performed, hot cracking occasionally occurs during the welding due to coarsening of crystal grains of the weld metal. Thus, attempts have hitherto been made to reduce the size of crystal grains of welds.

For example, Unexamined Japanese Patent Publication No. H5-138394 proposes a method wherein Ti is added to welding wire so that minute TiN particles may be produced and dispersed in the weld during welding, to allow minute crystal grains of weld metal to be formed around the TiN particles as nuclei.

Also, Unexamined Japanese Patent Publication No. H9-225680 proposes a method in which suitable amounts of Al and Mg are added to welding wire so that the crystal grains of the weld may be equiaxed and reduced in size.

Recently, however, higher weld crack resistance and increased strength at elevated temperatures are required, and the above conventional techniques do not satisfactorily meet the requirements.

SUMMARY OF THE INVENTION

The present invention was created in view of the above circumstances, and an object thereof is to provide a welding wire capable of forming a weld having high strength at elevated temperatures as well as high crack resistance, and a welding method using the welding wire.

The present invention provides a welding wire containing: 0.025 mass % or less of C; 1.3 mass % or less of Si; 2.0 mass % or less of Mn; 10 to 25 mass % of Cr; 0.04 to 0.2 mass % of N; Al and Ti in amounts (mass %) satisfying a relationship (1) below, $$e^{-800(x-0.05)^2} \times e^{-300(y-0.08)^2} \geq 0.5 \qquad (1)$$

(where x and y represent contents (mass %) of Al and Ti, respectively);

O in an amount (mass %) satisfying a relationship (2) below, $$z < (x+y-0.01)/0.5 \qquad (2)$$

(where z represents a total amount (mass %) of oxygen in the welding wire, and x and y are the same as those defined in the relationship (1)); and the balance being Fe and unavoidable impurities.

Also, the present invention provides a gas-shielded welding method using the welding wire and a shielding gas containing Ar and at least one of $O_2$ and $CO_2$, wherein, provided that volume % of the $O_2$ and $CO_2$ contained in the shielding gas are p and q, respectively (p and q do not simultaneously take a value of zero), the shielding gas satisfies relationships $p \leq 10$ and $q \leq 50$ and a relationship (3) below, $$p+q \leq (x+y-0.01-0.5z)/0.0006 \qquad (3)$$

(where x and y are the same as those defined in the relationship (1), and z is the same as that defined in the relationship (2)).

DETAILED DESCRIPTION OF THE PREFERRED EMBODIMENTS

Figure 1:
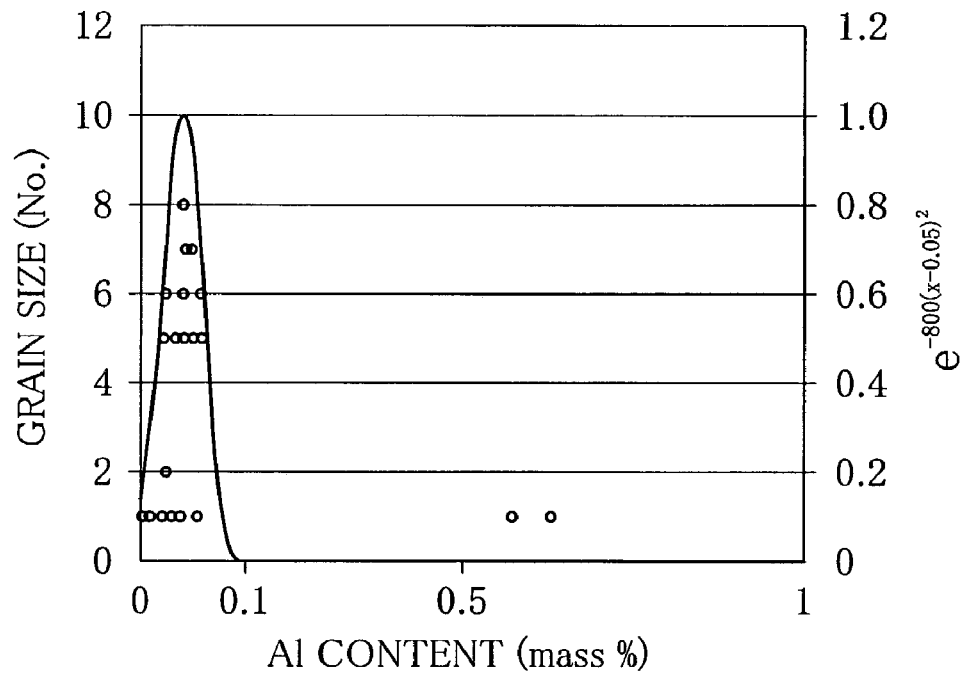
FIG. 1 is a graph showing the relationship between Al content of welding wire and grain size of weld.

The inventors hereof directed their attention to the fact that, where a stainless steel welding wire is admixed with Ti and Al, these components form minute nitride particles and are dispersed in the weld during welding, functioning as nuclei around which minute crystal grains are formed. Taking the fact into consideration, the inventors examined the relationship between the contents of Al and Ti in welding wire and the grain size of weld and, as a result, discovered that there is a correlation between these factors, as explained later.

Also, the inventors found that the function exerted by Al and Ti is affected by the amount of oxygen in the welding wire, as well as by the amounts of oxygen and carbon dioxide in the shielding gas used in gas-shielded welding.

Based on the findings, the inventors developed a welding wire of the present invention and a welding method using the wire.

The stainless steel welding wire according to the present invention contains, in addition to Al, Ti and O, 0.025 mass % or less of C, 1.3 mass % or less of Si, 2.0 mass % or less of Mn, 10 to 25 mass % of Cr, and 0.04 to 0.2 mass % of N. The reason why the components are contained in their respective amounts will be explained first.

In the welding wire of the present invention, C serves to increase the strength of the weld. If C is excessively added, however, C combines with Al and Ti to form carbides, hindering the production of Al nitride and Ti nitride. Thus, the content of C is set to 0.025 mass % or less.

Si functions as a deoxidizer and also contributes to the improvement of weld crack resistance. However, if Si is added excessively, the crystal grains of the weld become coarse; therefore, the Si content is set to 1.3 mass % or less.

Mn also functions as a deoxidizer. If too much Mn is added, however, the corrosion resistance, especially, the oxidation resistance of the weld deteriorates. Accordingly, the Mn content is set to 2.0 mass % or less.

Cr serves to increase the strength of the weld and at the same time contributes toward securing corrosion resistance. The Cr content is set to 10 to 25 mass %. If the Cr content is lower than 10 mass %, the intended advantageous effects are not obtained, and if the Cr content is higher than 25 mass %, the advantageous effects are saturated, leading to unnecessary increase in cost.

N is an essential component necessary to produce AlN and TiN that serve as nuclei of crystal grains, and the content thereof is set to 0.04 to 0.2 mass %. If the N content is lower than 0.04 mass %, the amounts of AlN and TiN produced are small, making it difficult to reduce the size of crystal grains of the weld. On the other hand, if the N content is higher than 0.2 mass %, AlN and TiN, which serve as crystal nuclei, agglomerate and decrease in number, lowering the effect of reducing the size of crystal grains.

The functions of Al, Ti and O, which are the most important components of the welding wire of the present invention, and the relationship between the functions and contents of these components will be now described.

Al and Ti both combine with N and the resulting minute particles of nitrides are uniformly dispersed in the weld. The minute particles serve as nuclei of crystal grains, making it possible to reduce the size of crystal grains in the metal structure of the weld.

Welding wires were actually produced with the Al and Ti contents x and y (both in mass %) varied, while the contents of the other components were kept substantially the same, for example, the C content was set to 0.01 mass %, the Si content was set to 1.00 mass %, the Mn content was set to 0.50 mass %, the Cr content was set to 19.0 mass %, and the N content was set to 0.10 mass %. Using the welding wires, steel plates were welded by gas-shielded welding with the use of a shielding gas containing 98 volume % Ar and 2 volume % $O_2$.

Figure 2:
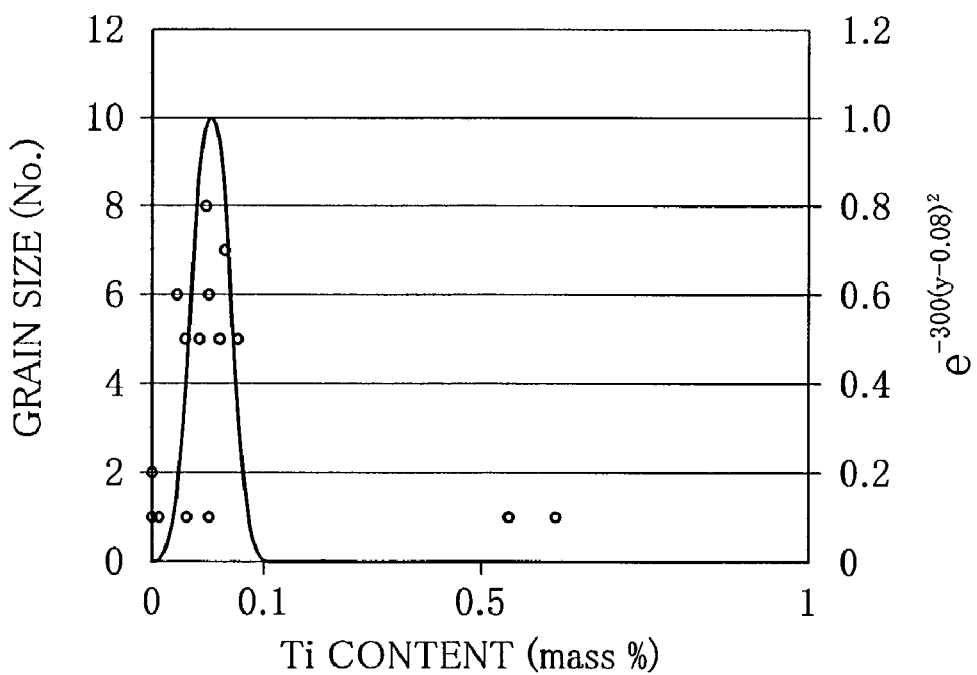
FIG. 2 is a graph showing the relationship between Ti content of welding wire and grain size of weld.

The grain sizes of the welds formed were measured, and the results are shown in FIGS. 1 and 2. FIG. 1 shows the relationship between the Al content and the grain size, and FIG. 2 shows the relationship between the Ti content and the grain size. The grain size (No.) was measured in conformity with JIS G 0552. The larger the grain size number, the smaller the grain diameter is.

As will be clear from the grain size histograms of FIGS. 1 and 2, a peak is located at 0.05 mass % for the Al content x and at 0.08 mass % for the Ti content y.

Also, the following facts were observed. Where x was smaller than 0.05 mass % and where y was smaller than 0.08 mass %, the AlN and TiN particles produced became smaller in number with decrease in x and y, respectively, with the result that the crystal grains of the weld coarsened. On the other hand, where x was larger than 0.05 mass % and where y was larger than 0.08 mass %, AlN and TiN became agglomerated with increase in x and y, respectively, and thus the numbers of particles decreased, with the result that the crystal grains of the weld coarsened.

Based on the observations, parameters $\exp\{-800(x-0.05)^2\}$ and $\exp\{-300(y-0.08)^2\}$ (hereinafter referred to as the parameters (1a) and (1b), respectively) were formulated. Values derived with respect to x and y by using the respective parameters are indicated along the right-hand vertical axes of FIGS. 1 and 2, respectively.

As will be seen from the figures, when the parameters (1a) and (1b) are "1", the grain sizes (Nos.) are at a maximum number of "10" (the grain diameters are smallest), and as the parameters approach "0" (zero), the grain size numbers become smaller.

According to the present invention, the Al and Ti contents x and y (both in mass %) are set such that the product of the two parameters (1a) and (1b) is larger than or equal to "0.5", as indicated by the expression (1) mentioned above, namely, $$e^{-800(x-0.05)^2} \times e^{-300(y-0.08)^2} \geq 0.5$$

The maximum values of the parameters are both "1", and accordingly, either one of the parameters must be "0.5" or larger in order that the product of the parameters (1a) and (1b) may be larger than or equal to "0.5". Consequently, the value that x can take ranges approximately from 0.02 to 0.08 mass % and the value that y can take ranges approximately from 0.05 to 0.11 mass %.

As already stated, it was found that the functions of Al and Ti are affected also by the amount of oxygen in the welding wire. Accordingly, in the present invention, the amount z (mass %) of O in the welding wire is so set as to satisfy the aforementioned relationship (2), namely, $$z < (x+y-0.01)/0.5$$

(where x and y represent the contents of Al and Ti, respectively).

It is essential that the contents of Al, Ti and O satisfy both of these relationships (1) and (2). In cases where the relationships are satisfied, a large number of minute particles of AlN and TiN are uniformly produced in the weld, making it possible to reduce the size of the crystal grains in the weld.

The welding wire of the present invention may further contain at least one selected from the group consisting of 1.0 mass % or less Nb, 0.1 mass % or less Zr, 0.1 mass % or less B, 5.0 mass % or less Mo, and 5.0 mass % or less W.

Nb, Zr and B are each a component that assists the formation of minute AlN and TiN particles in the weld and thus contributes to the reduction of the size of the crystal grains in the weld. If the components are added excessively, the arc fails to be stabilized, forming an unsatisfactory bead. Accordingly, the Nb content is limited to 1.0 mass % or less, and the Zr and B contents are each restricted to 0.1 mass % or less.

Each of Mo and W forms solid solution and serves to increase the strength of the weld. If the components are added excessively, however, they precipitate and make the weld brittle. Accordingly, the Mo and W contents are each restricted to 5.0 mass % or less.

A shielding gas used when performing gas-shielded welding by using the aforementioned welding wire will be now described.

The shielding gas used in the present invention contains Ar and at least one of $O_2$ and $CO_2$, and provided that the volume % of $O_2$ and $CO_2$ contained in the shielding gas are p and q, respectively, p and q satisfy $p \leq 10$, $q \leq 50$, and the following relationship (3):

$$p+q \leq (x+y-0.01-0.5z)/0.0006 \qquad (3)$$

(where x and y are the same as those defined in the relationship (1), and z is the same as that defined in the relationship (2)).

If p exceeds 10 volume %, the weld is oxidized excessively and also the crystal grains become coarse. On the other hand, if q exceeds 50 volume %, coarsening of the crystal grains also takes place.

If the shielding gas consists of Ar only, that is, if p and q are both zero, the arc becomes so unstable that a satisfactory bead cannot be formed. Accordingly, such shielding gas is not used in the present invention.

The right side of the expression (3) represents the rate of production of oxides and carbides by means of the shielding gas. If the sum of p and q, that is, p+q, is larger than the value of the right side of the expression, oxides and carbides are produced too much and become agglomerated, causing coarsening of the crystal grains. Accordingly, a situation where the sum of p and q exceeds the value of the right side of the expression should be avoided.

The shielding gas of the present invention may further contain one or both of $N_2$ and He. However, if $N_2$ and/or He are/is contained excessively, the arc becomes unstable, making it impossible to form a satisfactory bead, and also the crystal grains become coarse. Accordingly, $N_2$ and He to be contained in the shielding gas are restricted to 30 volume % or less and 50 volume % or less, respectively, based on the total volume of the shielding gas used.

EXAMPLES

Steels having the chemical compositions shown in Table 1 (Examples 1 to 12) and Table 2 (Comparative Examples 1 to 10) were prepared, rolled, and drawn into wires of 1.2 mm in diameter, thereby obtaining stainless steel welding wires of Examples (Ex.) 1 to 12 and Comparative Examples (Comp. Ex.) 1 to 10.

Using these welding wires and respective shielding gases having the compositions shown in Tables 3 and 4, butt welding was performed. The grain sizes of the welds formed were measured in conformity with JIS G 0552.

Also, a rod-shaped specimen consisting of the weld metal was cut out from each of the welds along the weld line and was subjected to a high-temperature tensile test at 950° C. in conformity with JIS G 0567.

Figure 3:
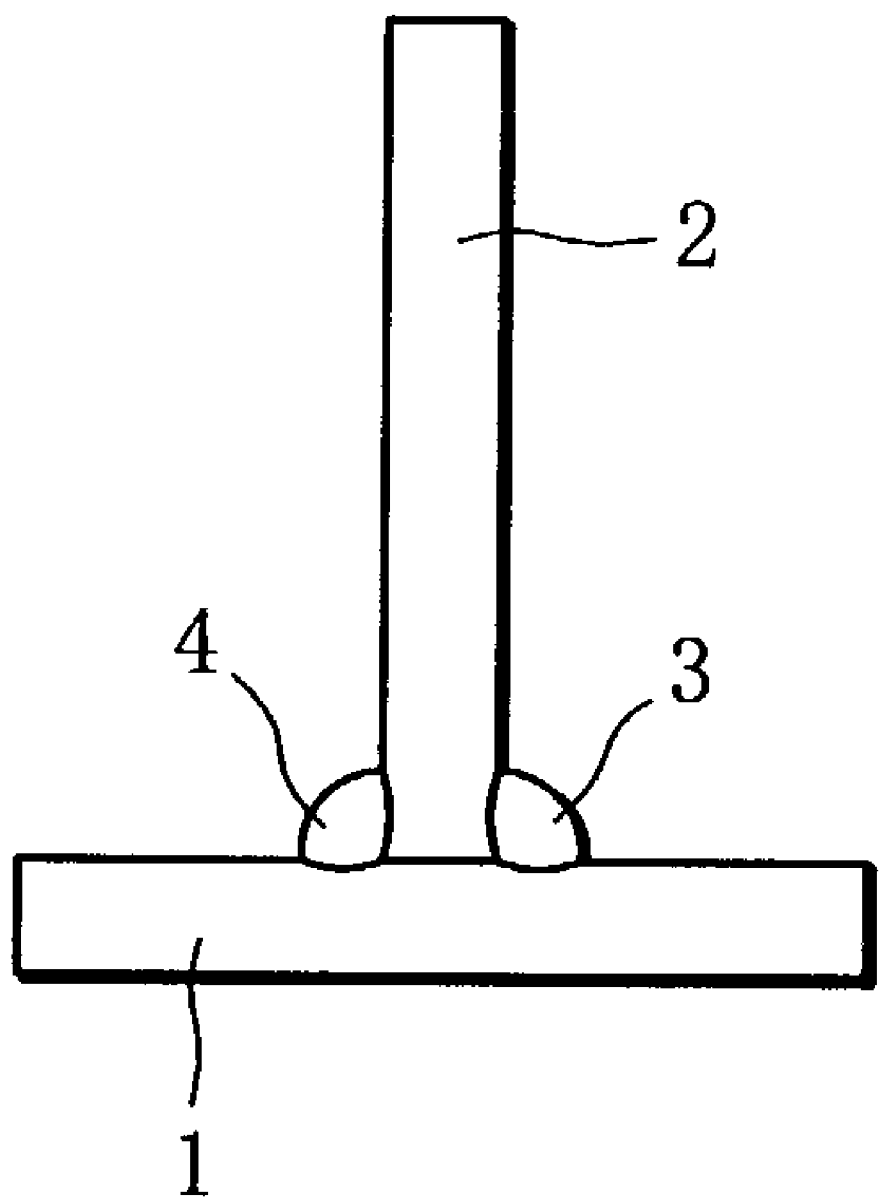
FIG. 3 is a diagram illustrating a T-type weld cracking test conducted on welding wire according to the present invention.

Further, T-type weld cracking test was conducted in the following manner. A flat steel plate 2 was set up on another flat steel plate 1 such that the steel plates had an inverted-T shape as viewed from one side thereof, as shown in FIG. 3, and using each of the welding wires of Examples 1 to 12 and Comparative Examples 1 to 10, fillet welding was performed on one right-angled corner of the two steel plates to form a bead 3, thereby fixing the steel plates together. Subsequently, fillet welding was performed on the other right-angled corner of the steel plates to form a bead 4 opposite to the bead 3, and the occurrence of cracking of the bead 4 was observed through color checking.

The results are also shown in Table 3 (Examples 1 to 12) and Table 4 (Comparative Examples 1 to 10).

TABLE 1

Compositions and Parameters of Welding Wires

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Composition (mass %) | C | 0.016 | 0.017 | 0.013 | 0.017 | 0.017 | 0.024 | 0.012 | 0.011 | 0.023 | 0.024 | 0.024 | 0.017 |
| | Si | 1.09 | 0.98 | 0.64 | 0.51 | 1.10 | 0.33 | 0.49 | 1.25 | 0.98 | 1.21 | 0.36 | 0.51 |
| | Mn | 0.46 | 1.50 | 1.15 | 0.84 | 1.75 | 0.67 | 0.52 | 1.18 | 1.23 | 0.99 | 1.60 | 0.60 |
| | Cr | 16.8 | 15.9 | 15.3 | 19.7 | 24.0 | 18.0 | 13.4 | 20.3 | 17.8 | 18.1 | 17.8 | 20.0 |
| | N | 0.198 | 0.097 | 0.147 | 0.198 | 0.124 | 0.184 | 0.147 | 0.047 | 0.162 | 0.075 | 0.196 | 0.059 |
| | Al (x) | 0.025 | 0.031 | 0.031 | 0.043 | 0.050 | 0.050 | 0.051 | 0.050 | 0.060 | 0.059 | 0.072 | 0.075 |
| | Ti (y) | 0.090 | 0.081 | 0.110 | 0.042 | 0.035 | 0.080 | 0.101 | 0.125 | 0.080 | 0.120 | 0.065 | 0.08 |
| | O (z) | 0.036 | 0.005 | 0.013 | 0.009 | 0.031 | 0.011 | 0.031 | 0.013 | 0.030 | 0.020 | 0.02 | 0.059 |
| | Other Elements | — | — | — | — | — | — | — | Nb: 0.500 | Nb: 0.500 Zr: 0.050 | B: 0.07 | Nb: 0.500 Mo: 1.50 | Nb: 0.250 Zr: 0.002 B: 0.05 Mo: 1.24 W: 1.00 |
| | Fe | bal. | bal. | bal. | bal. | bal. | bal. | bal. | bal. | bal. | bal. | bal. | bal. |
| Parameters | (1a) | 0.61 | 0.75 | 0.75 | 0.96 | 1.00 | 1.00 | 1.00 | 1.00 | 0.92 | 0.94 | 0.68 | 0.61 |
| | (1b) | 0.97 | 1.00 | 0.76 | 0.65 | 0.54 | 1.00 | 0.88 | 0.54 | 1.00 | 0.62 | 0.93 | 1.00 |
| | (1a) × (1b) | 0.59 | 0.75 | 0.57 | 0.62 | 0.54 | 1.00 | 0.88 | 0.54 | 0.92 | 0.58 | 0.63 | 0.61 |
| | (x + y − 0.01)/0.5 | 0.210 | 0.204 | 0.262 | 0.150 | 0.150 | 0.240 | 0.284 | 0.330 | 0.260 | 0.338 | 0.254 | 0.290 |

TABLE 2

Compositions and Parameters of Welding Wires

| | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| Composition (mass %) | C | 0.095 | 0.022 | 0.030 | 0.021 | 0.054 | 0.093 | 0.021 | 0.098 | 0.035 | 0.11 |
| | Si | 1.30 | 1.22 | 0.76 | 1.73 | 0.51 | 1.63 | 1.65 | 1.00 | 1.35 | 1.71 |
| | Mn | 1.57 | 2.38 | 2.41 | 1.41 | 2.31 | 1.77 | 2.48 | 1.31 | 1.66 | 2.31 |
| | Cr | 12.4 | 14.2 | 18.9 | 12.7 | 25.1 | 11.1 | 26.7 | 27.7 | 8.7 | 20.7 |
| | N | 0.362 | 0.404 | 0.051 | 0.193 | 0.151 | 0.054 | 0.125 | 0.312 | 0.146 | 0.187 |
| | Al (x) | 0.003 | 0.003 | 0.009 | 0.031 | 0.028 | 0.070 | 0.050 | 0.613 | 0.040 | 0.550 |
| | Ti (y) | 0.003 | 0.006 | 0.007 | 0.005 | 0.052 | 0.081 | 0.612 | 0.050 | 0.010 | 0.541 |
| | O (z) | 0.026 | 0.011 | 0.015 | 0.060 | 0.220 | 0.291 | 0.150 | 0.213 | 0.293 | 0.080 |
| | Other Elements | — | — | — | — | — | Nb: 0.250 | Mo: 1.50 | — | — | — |
| | Fe | bal. | bal. | bal. | bal. | bal. | bal. | bal. | bal. | bal. | bal. |
| Parameters | (1a) | 0.17 | 0.17 | 0.26 | 0.75 | 0.68 | 0.73 | 1.00 | 0.00 | 0.92 | 0.00 |
| | (1b) | 0.17 | 0.19 | 0.20 | 0.18 | 0.79 | 1.00 | 0.00 | 0.76 | 0.23 | 0.00 |
| | (1a) × (1b) | 0.03 | 0.03 | 0.05 | 0.14 | 0.54 | 0.73 | 0.00 | 0.00 | 0.21 | 0.00 |
| | (x + y −0.01)/0.5 | −0.008 | −0.002 | 0.01 | 0.052 | 0.140 | 0.282 | 1.304 | 1.306 | 0.080 | 2.16 |

TABLE 3

Shielding Gas Compositions and Weld Test Results

| | Shielding gas composition (vol. %) | | | | | | $\frac{x + y - 0.01 - 0.5z}{0.0006}$ | Weld Tensile test (950° C.) | | | |
|---|---|---|---|---|---|---|---|---|---|---|---|
| | Ar | $O_2$(p) | $CO_2$(q) | $N_2$ | He | p + q | | Grain size (No.) | Tensile strength (MPa) | Elongation (%) | Weld cracks |
| Ex. 1 | 95 | — | 5 | — | — | 5 | 145 | 5 | 36 | 79 | none |
| Ex. 2 | 95 | — | 5 | — | — | 5 | 166 | 6 | 37 | 81 | none |
| Ex. 3 | 95 | 3 | 2 | — | — | 5 | 208 | 5 | 36 | 80 | none |
| Ex. 4 | 95 | 1 | 4 | — | — | 5 | 118 | 5 | 37 | 78 | none |
| Ex. 5 | 91 | 5 | 4 | — | — | 9 | 99 | 6 | 37 | 80 | none |
| Ex. 6 | 82 | 2 | 1 | 5 | 10 | 3 | 191 | 8 | 38 | 82 | none |
| Ex. 7 | 96 | 2 | 2 | — | — | 4 | 211 | 7 | 38 | 83 | none |
| Ex. 8 | 45 | — | 5 | — | 50 | 5 | 264 | 5 | 36 | 80 | none |
| Ex. 9 | 65 | 4 | 1 | 30 | — | 5 | 192 | 7 | 37 | 79 | none |
| Ex. 10 | 95 | 1 | 4 | — | — | 5 | 265 | 5 | 35 | 81 | none |
| Ex. 11 | 97 | 1 | 2 | — | — | 3 | 195 | 5 | 35 | 83 | none |
| Ex. 12 | 95 | — | 5 | — | — | 5 | 193 | 6 | 37 | 80 | none |

TABLE 4

Shielding Gas Compositions and Weld Test Results

| | Shielding gas composition (vol. %) | | | | | | $\frac{x + y - 0.01 - 0.5z}{0.0006}$ | Weld Tensile test (950° C.) | | | |
|---|---|---|---|---|---|---|---|---|---|---|---|
| | Ar | $O_2$(p) | $CO_2$(q) | $N_2$ | He | p + q | | Grain size (No.) | Tensile strength (MPa) | Elongation (%) | Weld cracks |
| Comp. Ex. 1 | 95 | 2 | 3 | — | — | 5 | −28 | 1 | 25 | 35 | observed |
| Comp. Ex. 2 | 94 | 2 | 4 | — | — | 6 | −11 | 1 | 23 | 41 | observed |
| Comp. Ex. 3 | 97 | 1 | 2 | — | — | 3 | −3 | 1 | 24 | 38 | observed |
| Comp. Ex. 4 | 91 | 4 | 5 | — | — | 9 | −7 | 2 | 25 | 35 | observed |
| Comp. Ex. 5 | 94 | 1 | 5 | — | — | 6 | −67 | 1 | 22 | 34 | observed |
| Comp. Ex. 6 | 97 | 2 | 1 | — | — | 3 | −7 | 1 | 26 | 37 | observed |
| Comp. Ex. 7 | 98 | 1 | 1 | — | — | 2 | 962 | 1 | 25 | 35 | observed |
| Comp. Ex. 8 | 75 | 5 | 20 | — | — | 25 | 911 | 1 | 24 | 30 | observed |
| Comp. Ex. 9 | 80 | 20 | — | — | — | 20 | −178 | 1 | 24 | 28 | observed |
| Comp. Ex. 10 | 70 | 15 | 15 | — | — | 30 | 1735 | 1 | 24 | 26 | observed |

As is clear from Tables 3 and 4, in cases where the welding wires of Comparative Examples 1 to 10 were used, the grain sizes of the welds were either No. 1 or No. 2, showing coarse crystal grains, and also the tensile strengths at a high temperature of 950° C. were as low as 26 MPa or less. Further, in all of the comparative examples, cracking of the welds was observed in the T-type weld cracking test.

On the other hand, in cases where gas-shielded welding was carried out using the welding wires of Examples 1 to 12 satisfying both of the aforementioned conditions (1) and (2) and the shielding gases having the compositions satisfying the condition (3), the resulting welds had a grain size of No. 5 or higher and had a minute metal structure. Also, the welds had a high-temperature strength of 35 MPa or higher, much superior to those of the comparative example. Further, no weld cracks were observed in the T-type weld cracking test.

As will be clear from the above description, where gas-shielded welding is performed using the welding wire and shielding gas according to the present invention, the weld obtained is free from cracks attributable to coarsening of the crystal grains and has high strength at elevated temperatures.

Thus, with the welding wire of the present invention, Al and Ti combine with N and the resulting minute nitride particles are dispersed in the weld during gas-shielded welding using the shielding gas according to the present invention. Since the minute nitride particles serve as nuclei of crystal grains, the crystal grains of the weld are reduced in size. As a result, the weld is improved in crack resistance as well as in high-temperature strength.

What is claimed is:

1. A welding method comprising the steps of:
providing a stainless steel welding wire comprising C, Si, Mn, Cr, N, Al, Ti, O and Fe, wherein C is present in an amount of greater than zero and up to and including 0.025 mass %, Si is present in an amount of greater than zero and up to and including 1.3 mass %, Mn is present in an amount of greater than zero and up to and including 2.0 mass %, Cr is present in an amount of 10 to 25 mass %, N is present in an amount of 0.047 to 0.2 mass %, Al and Ti are present in amounts in mass % satisfying a relationship (1) below $$e{-800(x-0.05)^2} \text{ multiplied by } e{-300(y-0.08)^2} \geq 0.5 \quad (1)$$

wherein x and y represent contents in mass % of Al and Ti, respectively, O is present in an amount in mass % satisfying a relationship (2) below $$z<(x+y-0.01)/0.5 \quad (2)$$

wherein z represents a total amount in mass % of oxygen in the welding wire, and x and y represent the Al and Ti contents, respectively, defined in the relationship (1), and the balance being Fe and unavoidable impurities;

preparing a shielding gas containing Ar and at least one of $O_2$ and $CO_2$, provided that the volume % of the $O_2$ and $CO_2$ contained in the shielding gas are p and q, respectively, wherein p and q do not simultaneously have a value of zero, the shielding gas satisfies relationships $p \leq 10$ and $q \leq 50$ and a relationship (3) below $$p+q \leq (x+y-0.01-0.5z)/0.0006 \quad (3)$$

wherein x and y represent the Al and Ti contents, respectively, defined in the relationship (1), and z represents the total amount of O defined in the relationship (2); and performing a gas-shielded welding while supplying the shielding gas to a region around the welding wires, wherein during the welding method, AlN and TiN are formed in a welded portion.

2. The welding method according to claim 1, wherein the welding wire further comprises the presence of at least one additional element, said at least one additional element being selected from the group consisting of Nb in an amount of greater than zero and up to and including 1.0 mass %, Zr in an amount of greater than zero and up to and including 0.1 mass %, B in an amount of greater than zero and up to and including 0.1 mass %, Mo in an amount of greater than zero and up to and including 5.0 mass % and W in an amount of greater than zero and up to and including 5.0 mass %.

3. The welding method according to claim 1, wherein the shielding gas further comprises one or both of 30 volume % or less $N_2$ and 50 volume % or less He.

4. A stainless steel welding wire which consists essentially of C, Si, Mn, Cr, N, Al, Ti, O, Fe, Nb and Zr, wherein C is present in an amount of greater than zero and up to and including 0.025 mass %, Si is present in an amount of greater than zero and up to and including 1.3 mass %, Mn is present in an amount of greater than zero and up to and including 2.0 mass %, Cr is present in an amount of 10 to 25 mass %, N is present in an amount of 0.047 to 0.2 mass %, Nb is present in an amount of greater than zero and up to and including 1.0 mass %, Zr is present in an amount of greater than zero and up to and including 0.1 mass %, Al and Ti are present in amounts in mass % satisfying a relationship (1) below $$e{-800(x-0.05)^2} \text{ multiplied by } e{-300(y-0.08)^2} \geq 0.5 \quad (1)$$

wherein x and y represent contents in mass % of Al and Ti, respectively, O is present in an amount in mass % satisfying a relationship (2) below $$z<(x+y-0.01)/0.5 \quad (2)$$

wherein z represents a total amount in mass % of oxygen in the welding wire, and x and y represent the Al and Ti contents, respectively, defined in the relationship (1), and the balance being Fe and unavoidable impurities.

5. A stainless steel which consists essentially of C, Si, Mn, Cr, N, Al, Ti, O, Fe and B, wherein C is present in an amount of greater than zero and up to and including 0.025 mass %, Si is present in an amount of greater than zero and up to and including 1.3 mass %, Mn is present in an amount of greater than zero and up to and including 2.0 mass %, Cr is present in an amount of 10 to 25 mass %, N is present in an amount of 0.047 to 0.2 mass %, B is present in an amount of greater than zero and up to and including 0.1 mass %, Al and Ti are present in amount in mass % satisfying a relationship (1) below $$e{-800(x-0.05)^2} \text{ multiplied by } e{-300(y-0.08)^2} \geq 0.5 \quad (1)$$

wherein x and y represent contents in mass % of Al and Ti, respectively, O is present in an amount in mass % satisfying a relationship (2) below $$z<(x+y-0.01)/0.5 \quad (2)$$

wherein z represents a total amount in mass % of oxygen in the welding wire, and x and y represent the Al and Ti contents, respectively, defined in the relationship (1), and the balance being Fe and unavoidable impurities.

6. A stainless steel welding wire which consists essentially of C, Si, Mn, Cr, N, Al, Ti, O, Fe, Nb, Zr, B, Mo and W, wherein C is present in an amount of greater than zero and up to and including 0.025 mass %, Si is present in an amount of greater than zero and up to and including 1.3 mass %, Mn is present in an amount of greater than zero and up to and including 2.0 mass %, Cr is present in an amount of 10 to 25 mass %, N is present in an amount of 0.047 to 0.2 mass %, Nb is present in an amount of greater than zero and up to and including 1.0 mass %, Zr is present in an amount of greater than zero and up to and including 0.1 mass %, B is present in an amount of greater than zero and up to and including 0.1 mass %, Mo is present in an amount of greater than zero and up to and including 5.0 mass %, W is present in an amount of greater than zero and up to and including 5.0 mass %, Al and Ti are present in amounts in mass % satisfying a relationship (1) below $$e{-800(x-0.05)^2} \text{ multiplied by } e{-300(y-0.08)^2} \geq 0.5 \quad (1)$$

wherein x and y represent contents in mass % of Al and Ti, respectively, O is present in an amount in mass % satisfying a relationship (2) below $$z<(x+y-0.01)/0.5 \quad (2)$$

wherein z represents a total amount in mass % of oxygen in the welding wire, and x and y represent the Al and Ti contents, respectively, defined in the relationship (1), and the balance being Fe and unavoidable impurities.

7. The welding wire according to claim 4, wherein x is 0.02 to 0.08 mass % and y is 0.05 to 0.11 mass %.

8. The welding wire according to claim 4, wherein N is in an amount of 0.047 mass %.

9. The welding method according to claim 1, wherein the welding wire consists essentially of said C, Si, Mn, Cr, N, Al, Ti, O and Fe.

10. The welding method according to claim 2, wherein the welding wire consists essentially of said C, Si, Mn, Cr, N, Al, Ti, O and Fe and at least one element selected from the group consisting of Nb, Zr, B, Mo and W.

11. The welding method according to claim 1, wherein N is in an amount of 0.047 mass %.

* * * * *